United States Patent
Sudre

(10) Patent No.: US 12,134,583 B2
(45) Date of Patent: Nov. 5, 2024

(54) PARTICLE BASED INSERTS FOR CMC

(71) Applicant: Raytheon Technologies Corporation, Farmington, CT (US)

(72) Inventor: Olivier H. Sudre, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 443 days.

(21) Appl. No.: 17/400,638

(22) Filed: Aug. 12, 2021

(65) Prior Publication Data

US 2023/0047461 A1 Feb. 16, 2023

(51) Int. Cl.
*C04B 35/628* (2006.01)

(52) U.S. Cl.
CPC .. *C04B 35/62863* (2013.01); *C04B 35/62884* (2013.01); *C04B 2235/5244* (2013.01); *C04B 2235/614* (2013.01); *C04B 2235/6586* (2013.01); *C04B 2237/38* (2013.01)

(58) Field of Classification Search
CPC .......... F01D 5/187; F01D 5/282; F01D 5/284; F01D 9/065; F01D 9/041; F01D 5/147; C04B 35/62863; C04B 35/62884; C04B 2235/5244; C04B 2235/614; C04B 2235/6586; C04B 2237/38; C04B 35/80; B29D 99/0005
See application file for complete search history.

(56) References Cited

U.S. PATENT DOCUMENTS

| | | | |
|---|---|---|---|
| 7,312,274 B2 | 12/2007 | Millard et al. | |
| 10,099,456 B2 | 10/2018 | Song et al. | |
| 2005/0238491 A1* | 10/2005 | Morrison | F01D 5/187 416/229 R |
| 2012/0074265 A1 | 3/2012 | Hallander et al. | |
| 2014/0363663 A1* | 12/2014 | Lamouroux | C04B 35/62863 428/331 |
| 2016/0060752 A1 | 3/2016 | Jacques et al. | |
| 2016/0215634 A1 | 7/2016 | Walston | |
| 2016/0230568 A1* | 8/2016 | Sippel | B32B 18/00 |
| 2018/0045063 A1 | 2/2018 | Frey et al. | |
| 2019/0071364 A1* | 3/2019 | Harada | F01D 5/288 |
| 2019/0224938 A1* | 7/2019 | Feie | B29D 99/0005 |
| 2020/0392049 A1* | 12/2020 | Razzell | C04B 41/87 |
| 2022/0242079 A1* | 8/2022 | Holaday | B29C 65/7802 |

FOREIGN PATENT DOCUMENTS

| | | |
|---|---|---|
| EP | 1930548 A2 | 6/2008 |
| EP | 3590906 A1 | 1/2020 |

OTHER PUBLICATIONS

Extended European Search Report for EP Application No. 22189572.5, dated Dec. 12, 2022, 9 pages.

* cited by examiner

*Primary Examiner* — Courtney D Heinle
*Assistant Examiner* — Andrew Thanh Bui
(74) *Attorney, Agent, or Firm* — Kinney & Lange, P.A.

(57) ABSTRACT

A method for forming a ceramic matrix composite component includes forming a fibrous preform of the component with a plurality of fiber layers and a fill region disposed between one or more of the plurality of fiber layers. Ceramic particles are provided in the fill region, which is densified using chemical vapor infiltration.

18 Claims, 4 Drawing Sheets

PARTICLE BASED INSERTS FOR CMC

BACKGROUND

The present disclosure is directed generally to gas turbine engine components, and more particularly to ceramic matrix composite (CMC) components and the methods of forming CMC components.

CMC manufacture methods use traditional fiber-based fillers (e.g., unidirectional packed fiber tows, braided tows, and folded woven plies) to form "noodles" to fill in T-joint fillets or other spaces or open regions between plies or layers of a CMC fibrous preform. The density of these packed tows can block densification during the chemical vapor infiltration (CVI) process. Porous regions in and around the noodles can remain in the component due to inadequate densification. The residual porosity can lead to poor thermal properties, early failure, and debonding in the noodle region during operation.

SUMMARY

In one embodiment, the present disclosure is directed to a method for forming a ceramic matrix composite component. This method includes forming a fibrous preform of the component with a plurality of fiber layers and a fill region disposed between one or more of the plurality of fiber layers. Ceramic particles are provided in the fill region, which is densified using chemical vapor infiltration.

In another embodiment, the present disclosure is directed to a ceramic matrix composite component having a plurality of fiber layers disposed in a ceramic matrix, and a ceramic space filler disposed between one or more of the fiber layers. The ceramic space filler includes a plurality of ceramic particles disposed in a ceramic matrix.

The present summary is provided only by way of example, and not limitation. Other aspects of the present disclosure will be appreciated in view of the entirety of the present disclosure, including the entire text, claims, and accompanying figures.

Figure 1:
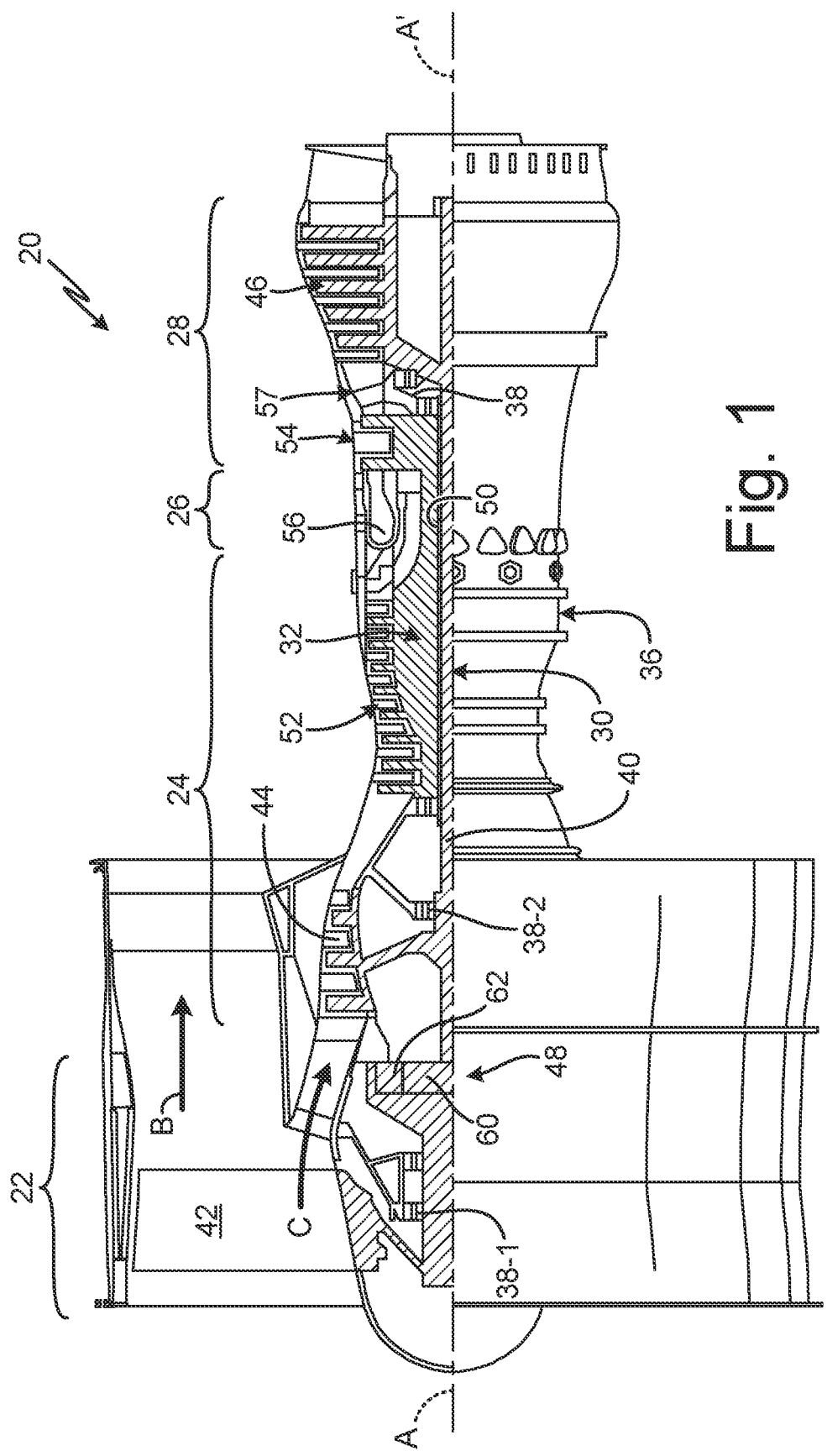
FIG. 1 illustrates a quarter-sectional view of an exemplary gas turbine engine, in accordance with various embodiments.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

In various embodiments and with reference to FIG. 1, a gas turbine engine 20 is provided. Gas turbine engine 20 may be a two-spool turbofan that generally incorporates a fan section 22, a compressor section 24, a combustor section 26, and a turbine section 28. Alternative engines may include, for example, an augmentor section among other systems or features. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low-speed spool 30 and a high-speed spool 32 mounted for rotation about an engine central longitudinal axis A'-A relative to an engine static structure 36 or engine case via several bearing systems 38, 38-1, and 38-2. Engine central longitudinal axis A'-A is oriented in the z direction on the provided xyz axis. It should be understood that various bearing systems 38 at various locations may alternatively or additionally be provided, including for example, bearing system 38, bearing system 38-1, and bearing system 38-2.

Low-speed spool 30 may generally comprise an inner shaft 40 that interconnects a fan 42, a low-pressure compressor 44, and a low-pressure turbine 46. Inner shaft 40 may be connected to fan 42 through a geared architecture 48 that can drive fan 42 at a lower speed than low-speed spool 30. Geared architecture 48 may comprise a gear assembly 60 enclosed within a gear housing 62. Gear assembly 60 couples inner shaft 40 to a rotating fan structure. High-speed spool 32 may comprise an outer shaft 50 that interconnects a high-pressure compressor 52 and high-pressure turbine 54. A combustor 56 may be located between high-pressure compressor 52 and high-pressure turbine 54. A mid-turbine frame 57 of engine static structure 36 may be located generally between high-pressure turbine 54 and low-pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A'-A, which is collinear with their longitudinal axes. As used herein, a "high-pressure" compressor or turbine experiences a higher pressure than a corresponding "low-pressure" compressor or turbine.

The core airflow C may be compressed by low-pressure compressor 44 then high-pressure compressor 52, mixed and burned with fuel in combustor 56, then expanded over high-pressure turbine 54 and low-pressure turbine 46. Turbines 46, 54 rotationally drive the respective low-speed spool 30 and high-speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low-pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low-pressure compressor 44, and the low-pressure turbine 46 may have a pressure ratio that is greater than about five (5:1). Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 20 may include one or more CMC components. For example, fan section 22, compressor section 24, and turbine section 28 may each comprise one or more stages or sets of rotating blade assemblies and one or more stages or sets of stationary vane assemblies axially interspersed with the associated blade stages but non-rotating about engine central longitudinal axis A-A'. In various embodiments, the blade and/or vane assemblies in fan section 22, compressor section 24, and/or turbine section 28 may comprise a CMC component. For example, in various embodiments, an airfoil of the blade or vane assembly may be formed from CMC. In various embodiments, combustor 56 may include one or more CMC component(s). For example, combustor shells, heat shield panel, and/or liners may be formed from CMC.

CMC components of the present disclosure require space fillers to provide complete densification of complex CMC geometries. In the present disclosure, traditional fiber-based fillers (e.g., unidirectional packed fiber tows, braided tows, and folded woven plies) are replaced with ceramic particles packed into the "noodle" space using a variety of methods. The ceramic particles can fill complex shapes and tight spaces while providing sufficient porosity to allow for densification of the region in subsequent CVI or liquid infiltration processes. The ceramic particles can create a three-dimensional network of pores that can allow gas flow and infiltration during the CVI process as well as liquid flow during melt or polymer infiltration processes thereby improving densification in this region. As disclosed herein, the size and shape of the ceramic particles can be selected to provide a desired packing density or porosity in spaces of varying sizes and geometries to achieve effective densification. Densification using the disclosed methods can improve the interlaminar and thermal properties of the CMC component.

Figure 2:
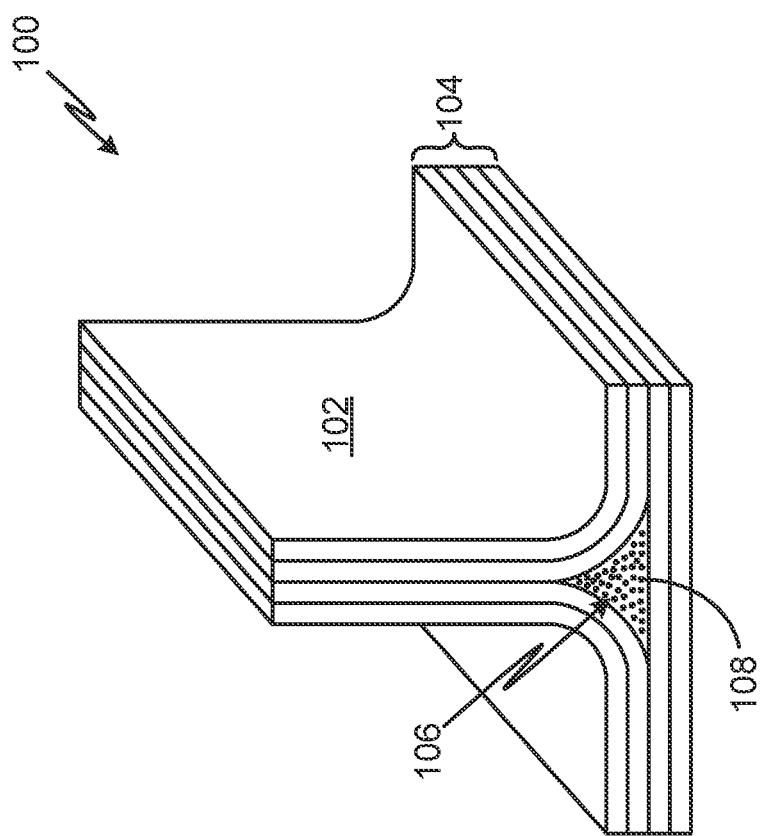
FIG. 2 illustrates a fibrous preform having ceramic particles in a fill region.

FIG. 2 illustrates a portion of a fibrous preform 100 of a CMC component. Fibrous preform 100 can be, for example, a portion of a blade, vane, blade outer air seal, combustor, exhaust case, or other component formed from a CMC material as previously described. Fibrous region 102, fiber layers 104, fill region 106, and particles 108 are shown. As illustrated in FIG. 2, fibrous region 102 can be formed from a plurality of fiber layers 104 provided in a stacked or layered arrangement. Fiber layers 104 can be, for example, woven, braided, or unidirectional fiber sheets or plies. In some embodiments, fibrous region 102 can be formed from a three-dimensional woven fabric fiber layer and one or more additional three-dimensional or two-dimensional fiber layers. Fibers of fibrous region 102 can be formed, for example, from silicon carbide or carbon.

Fill region 106 can be formed between adjacent fiber layers 104. For example, as illustrated in FIG. 2, fill region 106 can be formed in a T-joint fillet region formed between adjacent fiber layers 104. In other examples, fill region 106 can be formed in a fold region of a single fiber layer 106 or a space provided between fiber layers, for example, formed by removal of an insert used in a layup process. It will be understood by one of ordinary skill in the art that fill region 106 can be a gap or void of any size and shape formed in a fiber layup process and requiring densification and is not limited to the embodiments shown. Fill region 106 can be formed between fiber layers 104 of differing fiber constructions. For example, fill region 106 can be formed between a three-dimensional woven fabric layer and a two-dimensional woven fiber ply, or between a three-dimensional woven fabric layer and a braided fiber ply, or between a two-dimensional woven fiber ply and a braided fiber ply.

Particles 108 can be packed in fill region 106 in a manner that provides connected porosity or three-dimensional porous network that allows for gas or liquid infiltration during a CVI or liquid infiltration process. Particles 108 can be ceramic particles including, for example, silicon carbide. In other examples, particles 108 may comprise other carbides or borides. A material of particles 108 can be selected to have a thermal expansion equivalent substantially equal to or lower than a thermal expansion equivalent of the surrounding matrix material to limit cracking upon cooling of the CMC component.

Particles 108 can be ceramic powders, chopped fibers, or combinations thereof. Powder material can consist of powders of differing sizes and/or shapes. A powder size distribution and powder shape can be selected to achieve a desired packing density and/or three-dimensional connected porosity to achieve sufficiently complete densification in a subsequent CVI or liquid infiltration process. In some examples, powders can have an average diameter of less than about 100 microns, or between about 10 microns and 100 microns. The size of particles 108 can vary depending on a size and shape of fill region 106. Particle size can vary through a fill region of complex geometry. For example, smaller particles may be used to fill smaller regions of a complex fill region 106. In some examples, particles 108 can include aggregates of powders. In some examples, particles 108 can include a combination of one or more powders, powder aggregates, and chopped fibers.

Particles 108 can be coated, for example, with an interphase or interfacial coating such as boron nitride. In some examples, coatings can be formed on particles 108 prior to providing particles 108 to fill regions 106. In other examples, coatings can be formed on both particles 108 and fibers in fibrous region 102 simultaneously and prior to component densification. Coatings can protect particles 108 from environmental degradation and limit crack propagation during operation.

As described further herein, particles 108 can be provided to fill region 106 in a slurry. For example, particles 108 can be suspended in water or alcohol for delivery to fill region 106. In some examples, the slurry can include a binder material such as polyvinyl alcohol (PVA) or polyvinyl butyral (PVB). Fill region 106 can be open on one end to receive particles 108 and can be closed on one end (e.g., opposite the open end) to contain particles 108.

Figure 3:
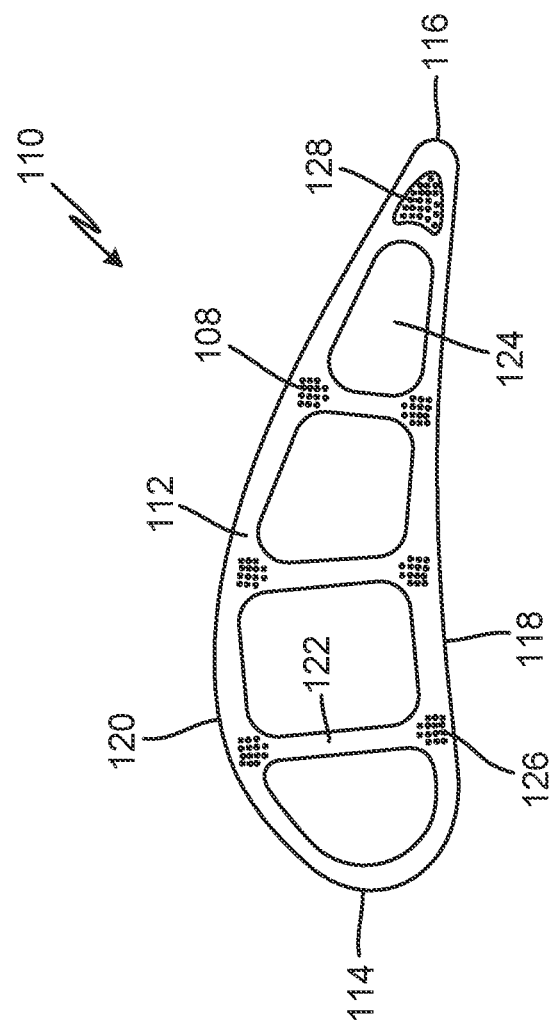
FIG. 3 illustrates a cross-sectional view of an airfoil having multiple fill regions comprising ceramic particles.

FIG. 3 illustrates a cross-sectional view of an airfoil 110 formed according to the methods disclosed herein. Fibrous body 112, leading edge 114, trailing edge 116, pressure side 118, suction side 120, ribs 122, cavities 124, fill regions 126 and 128, and particles 108 are shown. Fibrous body 112 includes leading edge 114, trailing edge 116, pressure side 118, and suction side 120. Ribs 122 extend between interior walls of pressure side 118 and suction side 120 thereby connecting pressures side 118 and suction side 120 and defining, at least partially, cavities 124. Fill regions 126 are formed at an intersection of ribs 122 and pressure and suction sides 118, 120. Fill region 128 is formed at trailing edge 116 between pressure and suction sides 118, 120.

Fibrous body 112 and ribs 122 can be formed from a plurality of fiber layers as described with respect to fibrous region 102 of FIG. 2. For example, fiber layers can be wrapped around mandrels having the shapes of cavities 124 to form ribs 122 and inner layers or walls of fibrous airfoil body 112. Outer fiber layers can then be wrapped around the plurality of wrapped mandrels to form the outer walls of fibrous airfoil body 112. Fill regions 126 can form between the outer fiber layers forming fibrous body 112 and the fiber layers forming ribs 122 in a manner similar to that shown in FIG. 2. Fill region 128 can be formed in trailing edge 116 between fiber layers provided around cavity 124 in trailing edge 116 and fiber layers forming fibrous body 112 at trailing edge 116.

As described with respect to FIG. 2, particles 108 can be provided to fill regions 126 and 128 to achieve a desired packing density or interconnected pore network as needed for densification. Particles 108 can be provided to fill regions 126 and 128 according to any of the methods described further herein.

Figure 4:
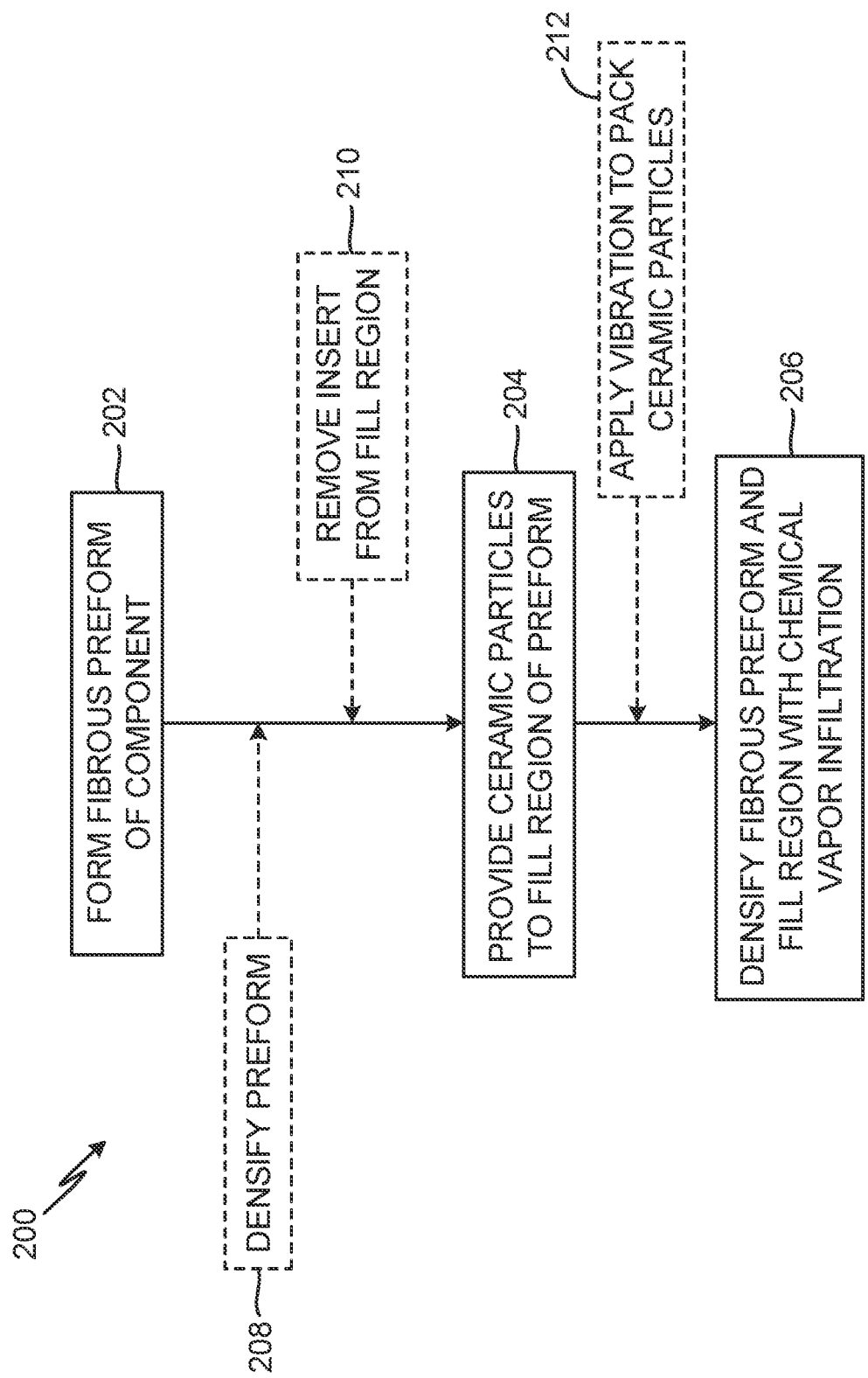
FIG. 4 illustrates a method of making a CMC component in accordance with various embodiments.

FIG. 4 illustrates method 200 of making a CMC component in accordance with various embodiments. Method 200 includes forming a fibrous preform of a component (step 202), providing ceramic particles to a fill region of the preform (step 204), densifying the fill region with CVI (step 206), and optional steps of densifying the preform (step 208) and removing an insert from the fill region (step 210) prior to providing ceramic particles to the fill region, and the optional step of packing the particles using vibration (step 212) prior to densifying the fill region with CVI. Additional steps as known in the art or described herein but not illustrated can be taken to provide CMC component suitable for operation.

As described with respect to FIGS. 2 and 3, a fibrous preform can be formed, for example, from a plurality of fiber layers arranged in layers as known in the art. In some examples, voids or fill regions can be formed at intersections between fiber layers. In some examples, fiber layers can be wrapped around one or more temporary inserts provided in the locations of fill regions. Temporary inserts can be, for example, plastic, aluminum, or graphite tools designed to be removable from the fibrous preform before or following densification. For example, temporary inserts may be tapered to improve ease of extraction from the fibrous preform or densified fiber body. The temporary insert can define the size and shape of the fill region, which can be used to improve packing distribution determinations. The temporary insert can be removed before ceramic particles are added to the fill regions.

The fibrous preform can be formed to provide fill regions that are open to the exterior to allow access for providing fill particles. Fill regions can be closed at an end opposite the opening to contain fill particles. A size of the opening to the fill region can be larger than a size of the ceramic particles but equal to or less than a cross-sectional area of the fill region. In some embodiments, fiber layers can be arranged to maintain an opening to the fill region. In other embodiments, an opening can be made subsequent to fiber layup, for example, by providing a hole through one or more fiber layers from an exterior surface and opening to the fill region.

The fibrous preform can be debulked or consolidated prior to providing ceramic particles to the fill region or prior to removing a temporary insert if used. For example, a tackifier such as PVA or PVB can be applied to consolidate the fiber layers and to help maintain a shape of the fibrous body including the fill region. In various embodiments, the fibrous preform can be compressed in a graphite tooling, which can be used in one or more subsequent CVI densification steps as known in the art.

In some embodiments, the fibrous preform can undergo a first CVI densification step (step 208) following consolidation of the fibrous preform but before providing ceramic particles to the fill region. In some embodiments, the temporary insert can be removed (step 210) following the first densification step if the temporary insert is formed of a material suitable for the CVI densification process. For example, a fibrous preform can have a fill region, such as a fillet or cavity, that is accessible to an outer surface after preforming. A graphite insert can be provided in the fill region and can remain in place during the first CVI densification step. The graphite insert could be tapered to be easily pulled out or could be segregated or coated to help release from the partially densified fibrous preform after the first CVI densification step, leaving the fill region open for fill with the ceramic particles.

The CVI process is used to form a ceramic (e.g., SiC) matrix on and around the fibers of the preform. Pores of the fibrous preform are infiltrated with the SiC, or other ceramic material, to form a densified fibrous structure. The first CVI densification step can partially densify the fibrous preform. The first CVI densification step can be conducted according to methods known in the art. For example, in various embodiments, the CVI process can involve heating the fibrous preform in a furnace and flowing precursor gases into the furnace where they can infiltrate the fibrous preform and react to form a ceramic matrix. The first CVI densification step can occur with the fibrous preform in the graphite tooling to maintain a shape of the preform. The graphite tooling can typically be removed when there is sufficient ply-to-ply bonding to hold the fibrous preform together.

An interfacial coating can be provided to the fibers of the fibrous preform via CVI prior to the first CVI densification step as known in the art. The interfacial coating can include, for example, boron nitride. The interfacial coating can protect fibers from environmental degradation and prevent cracks that form in the matrix material from propagating through the fibers during operation.

Ceramic particles can be provided to the fill region of the undensified or partially densified fibrous preform (step 204). If desired, ceramic particles provided to a partially densified fibrous preform (fibrous preform that has undergone the first densification step) can be coated with an interfacial coating such as boron nitride prior to addition to the fill region. Ceramic particles provided to an undensified fibrous preform can be coated with an interfacial coating at the same time the interfacial coating is applied to fibers of the fibrous preform.

In some examples, ceramic particles can be provided to the fill region of the fibrous preform following consolidation of the fibrous preform but prior to densification via CVI. In some examples, one or more fiber layers can be arranged to form the fibrous preform. The fibrous preform can be consolidated as described above leaving one or more fill regions defined by an insert, which is removed, or space left between adjacent fiber layers in the layup and consolidation process. The ceramic particles can be provided to the fill region that is at least partially closed to contain the ceramic particles. Following addition of the ceramic particles, the fill region can be closed. In some examples, further ply layup can be provided to form a final fibrous preform containing ceramic particles in one or more fill regions.

Ceramic particles can be added dry or in a slurry with water, alcohol, or other suitable solvent. Dry ceramic particles can be provided to fill regions, for example, via funneling into an opening of the fill region. A slurry can be provided to the fill regions, for example, via injection into the fill region. The slurry can be dried leaving the ceramic particles in a packed arrangement separated by interconnected pores configured to allow gas through the fill region during subsequent CVI densification. In some examples, a polymer binder material such as PVA or PVB can be provided with the ceramic particles in the slurry to help bind the ceramic particles and the adjacent fiber layers during the preforming and consolidation process. The polymer binder can be burned out in the densification process leaving the ceramic particles in a packed arrangement separated by interconnected pores configured to allow gas through the fill region during subsequent CVI densification. As such, both liquid and binder material can be replaced with the ceramic matrix.

In some examples, vibration can be applied to the ceramic particles in the fill region to pack the ceramic particles leaving a desired three-dimensional connected porosity for densification (step 212). As previously discussed, a size and shape of the ceramic particles can be selected based on the size and shape of the fill region and desired packing density or resulting interconnected pore sizes. Generally, an average size of the particles should be fairly large, for example, in the range of 1 to 50 microns and preferably in the range of 20 to 40 microns to ensure a homogeneous infiltration of the matrix during the CVI process. Mixtures of particle size and vibration can ensure packing to 40 to 60% and good contact with the preform (partially densified or not). A good packing minimizes shrinkage cracking during solvent removal or pyrolysis of the binder. In this manner, the porosity of the fill region can be tailored to ensure densification via CVI that occurs in the fill regions is sufficient to limit debonding during operation and provides desired thermal properties. In some examples, a packing density of the ceramic particles or interconnected porosity of the fill region can be similar to a fiber packing density or interconnected porosity in the fibrous region. In some examples, a packing density can be varied through the fill region to improve densification.

In other embodiments, a thick slurry (e.g., paste) of the ceramic particles and polymer binder material can be squeezed or otherwise spread in a fill region during the layup process. The slurry can be moldable and can deform to fill the space of the fill region. As previously described, the binder material can be burned out or liquified and removed in the densification process and replaced with the ceramic matrix material.

In other embodiments, a slurry (e.g., paste) of the ceramic particles can be formed using a preceramic polymer. The polymer can be cured and pyrolyzed to provide strength to the fill region and bonding to adjacent layers prior to the densification by CVI.

The consolidated fibrous preform with ceramic particles contained in fill regions can undergo densification via CVI (step 206) as described with respect to the first densification step (step 208). As previously described, an interfacial coating can be applied to the fibers of the fibrous preform as well as ceramic particles in the fill regions prior to CVI densification. During the CVI densification process, a ceramic matrix can be formed both on and between fibers of the fibrous preform and on and between ceramic particles in the fill regions. For fibrous preforms that have undergone a first CVI densification step (step 208) prior to addition of ceramic particles, the subsequent CVI densification step (step 206) provides additional densification of the fibrous preform in addition to densification of the fill regions.

The fibrous preform can undergo multiple CVI densification steps as known in the art. In some embodiments, the fibrous preform can remain porous following CVI densification and can undergo further densification, for example, via a melt infiltration process, to complete densification.

The disclosed methods including the disclosed variations thereof can be used to enhance densification of a variety of CMC components and are not limited to use with the illustrated fiber layups or CMC components. The disclosed methods can be used to fill cavities that are accessible to an outer surface or enclosed following the preforming process.

A CMC component formed using the disclosed methods can include a plurality of fiber layers in a fibrous region and a plurality of ceramic particles in a ceramic space filler, for example, fill regions 126 and 128 of FIG. 3. The fiber layers and the ceramic particles are disposed in a ceramic matrix. The ceramic particles can include spherical or otherwise shaped powders, powder aggregates, chopped fibers, and combinations thereof. The ceramic particles in a ceramic space filler can vary in size and shape. In some examples, ceramic particles can be packed with a density similar to a fiber packing density of the CMC component. In some examples, the ceramic particle density can vary through the ceramic space filler. For example, the ceramic particle density can increase toward an interior of the CMC component. The ceramic particles can be coated with an interfacial coating, such as boron nitride.

CMC components of the present disclosure require space fillers to provide complete densification of complex CMC geometries. As illustrated in FIGS. 2 and 3, the ceramic space filler can be located at a junction where two or more fiber layers meet (e.g., fill regions 106, 126, and 128). Such junctions can be provided to form, for example, flanges on blade outer air seals, combustors, vanes, and blades; internal ribs of an airfoil as illustrated in FIG. 3; and fillet regions between blade or vane platforms or end walls and airfoils (e.g., FIG. 2). Ceramic space fillers can be provided in larger regions of a CMC component, for example, as illustrated in FIG. 3, the ceramic space filler can be located in the trailing edge region (fill region 128) of an airfoil.

The ceramic particles of the present disclosure can fill complex shapes and tight voids formed in fibrous preforms while providing sufficient porosity to allow for densification of the region in subsequent CVI and liquid infiltration processes. The ceramic particles can create a three-dimensional network of pores that can allow gas flow and infiltration during the CVI process as well as liquid flow during melt or polymer infiltration processes thereby improving densification in this region. As disclosed herein, the size and shape of the ceramic particles can be selected to provide a desired packing density or porosity in spaces of varying sizes and geometries to achieve effective densification. Densification using the disclosed methods can improve the interlaminar and thermal properties of the CMC component.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

DISCUSSION OF POSSIBLE EMBODIMENTS

The following are non-exclusive descriptions of possible embodiments of the present invention.

A method for forming a ceramic matrix composite component, the method comprising: forming a fibrous preform of the component, the fibrous preform comprising a plurality of fiber layers and a fill region disposed between one or more of the plurality of fiber layers; providing ceramic particles in the fill region; and densifying the fill region using chemical vapor infiltration.

The method of the preceding paragraph can optionally include, additionally and/or alternatively, any one or more of the following features, configurations and/or additional components:

A further embodiment of the foregoing method, wherein forming the fibrous preform comprises arranging the plurality of fiber layers around a temporary insert, wherein the temporary insert is located in the fill region.

A further embodiment of the foregoing method, further comprising: densifying the fibrous preform; and removing the temporary insert, wherein the temporary insert is removed before providing the plurality of ceramic particles in the fill region.

A further embodiment of the foregoing method, wherein the plurality of ceramic particles comprises powders, short fibers, or combinations thereof.

A further embodiment of the foregoing method, wherein ceramic particles of the plurality of ceramic particles are coated with an interphase material.

A further embodiment of the foregoing method, wherein the ceramic particles comprise silicon carbide.

A further embodiment of the foregoing method, wherein providing the plurality of ceramic particles comprises injecting a slurry of the ceramic particles into the fill region.

A further embodiment of the foregoing method, wherein the slurry of the ceramic particles is provided as a moldable material in the fill region.

A further embodiment of the foregoing method, wherein the slurry of the ceramic particles is formed using a preceramic polymer, and further comprising curing and pyrolyzing the slurry of ceramic particles prior to densifying the fill region.

A further embodiment of the foregoing method, wherein an average size of the plurality of ceramic particles is in a range of 20-40 microns A further embodiment of the foregoing method, further comprising: applying vibration to the plurality of ceramic particles in the fill region to pack the plurality of ceramic particles in the fill region.

A further embodiment of the foregoing method, further comprising: closing the fill region after the plurality of ceramic particles has been provided.

A ceramic matrix composite component comprising: a plurality of fiber layers disposed in a ceramic matrix; and a ceramic space filler disposed between one or more of the fiber layers, wherein the ceramic space filler comprises a plurality of ceramic particles disposed in a ceramic matrix.

The ceramic matrix composite component of the preceding paragraph can optionally include, additionally and/or alternatively, any one or more of the following features, configurations and/or additional components:

A further embodiment of the foregoing ceramic matrix composite component, wherein ceramic particles of the plurality of ceramic particles comprise silicon carbide coated with an interphase material.

A further embodiment of the foregoing ceramic matrix composite component, wherein the plurality of ceramic particles comprises powders, short fibers, or combinations thereof.

A further embodiment of the foregoing ceramic matrix composite component, wherein the plurality of layers comprises: a first layer; and a second layer, wherein the first layer and second layer have differing fiber constructions.

A further embodiment of the foregoing ceramic matrix composite component, wherein the ceramic space filler is located at a junction where two or more fiber layers meet.

A further embodiment of the foregoing ceramic matrix composite component, wherein the component is an airfoil and the ceramic space filler is located in a trailing edge region of the airfoil.

A further embodiment of the foregoing ceramic matrix composite component, wherein the component is an airfoil and the ceramic space filler is located in an internal rib extending spanwise through the airfoil and connecting a pressure side and suction side of the airfoil.

A further embodiment of the foregoing ceramic matrix composite component, wherein the component is vane having two end walls separated by an airfoil and the ceramic space filler is located in a junction between the airfoil and at least one of the end walls.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for forming a ceramic matrix composite component, the method comprising:
   forming a fibrous preform of the component, the fibrous preform comprising a plurality of fiber layers and a fill region disposed between one or more of the plurality of fiber layers;
   providing ceramic particles in the fill region, the ceramic particles disposed in a packed arrangement and separated by interconnected pores; and
   densifying the fill region using chemical vapor infiltration, wherein densifying the fill region comprises forming a ceramic matrix between the ceramic particles, wherein providing the plurality of ceramic particles in the fill region comprises providing a moldable slurry comprising the ceramic particles and a binder material in the fill region.

2. The method of claim 1, wherein forming the fibrous preform comprises arranging the plurality of fiber layers around a temporary insert, wherein the temporary insert is located in the fill region.

3. The method of claim 2 and further comprising:
densifying the fibrous preform; and
removing the temporary insert, wherein the temporary insert is removed before providing the plurality of ceramic particles in the fill region.

4. The method of claim 1, wherein the plurality of ceramic particles comprises powders, short fibers, or combinations thereof.

5. The method of claim 1, wherein ceramic particles of the plurality of ceramic particles are coated with an interphase material.

6. The method of claim 1, wherein the ceramic particles comprise silicon carbide.

7. The method of claim 1, wherein the slurry of the ceramic particles is formed using a preceramic polymer, and further comprising curing and pyrolyzing the slurry of ceramic particles prior to densifying the fill region.

8. The method of claim 1, wherein an average size of the plurality of ceramic particles is in a range of 20-40 microns.

9. The method of claim 1, further comprising:
applying vibration to the plurality of ceramic particles in the fill region to pack the plurality of ceramic particles in the fill region.

10. The method of claim 1, further comprising:
closing the fill region after the plurality of ceramic particles has been provided.

11. A ceramic matrix composite component comprising:
a plurality of fiber layers disposed in a ceramic matrix, the plurality of fiber layers comprising a first fiber layer and a second fiber layer, wherein the first fiber layer and second fiber layer have differing fiber constructions; and
a ceramic space filler disposed between the first fiber layer and the second fiber layer, wherein the ceramic space filler comprises a plurality of ceramic particles disposed in a ceramic matrix, wherein ceramic particles of the plurality of ceramic particles comprise silicon carbide coated with an interphase material.

12. The ceramic matrix composite component of claim 11, wherein the plurality of ceramic particles comprises powders, short fibers, or combinations thereof.

13. The ceramic matrix composite component of claim 11, wherein the ceramic space filler is located at a junction where two or more fiber layers meet.

14. The ceramic matrix composite component of claim 11, wherein the component is an airfoil and the ceramic space filler is located in a trailing edge region of the airfoil.

15. The ceramic matrix composite component of claim 11, wherein the component is an airfoil and the ceramic space filler is located in an internal rib extending spanwise through the airfoil and connecting a pressure side and suction side of the airfoil.

16. The ceramic matrix composite component of claim 11, wherein the component is vane having two end walls separated by an airfoil and the ceramic space filler is located in a junction between the airfoil and at least one of the end walls.

17. The method of claim 1, wherein providing ceramic particles in the fill region comprises adding dry ceramic particles to the fill region.

18. The ceramic matrix composite component of claim 11, wherein the fiber constructions of the first fiber layer and the second fiber layer are selected from the group consisting of a three-dimensional woven fabric layer, a two-dimensional woven fiber ply, and a braided fiber ply.

* * * * *